US010889089B2

(12) United States Patent
Takeda et al.

(10) Patent No.: US 10,889,089 B2
(45) Date of Patent: Jan. 12, 2021

(54) STRETCHABLE FILM, STRETCHABLE LAMINATE AND ARTICLE COMPRISING SAME

(71) Applicant: NITTO DENKO CORPORATION, Ibaraki (JP)

(72) Inventors: Kohei Takeda, Ibaraki (JP); Muneshige Nakagawa, Ibaraki (JP); Shinsuke Ikishima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/348,565

(22) PCT Filed: Dec. 1, 2017

(86) PCT No.: PCT/JP2017/043244
§ 371 (c)(1),
(2) Date: May 9, 2019

(87) PCT Pub. No.: WO2018/123439
PCT Pub. Date: Jul. 5, 2018

(65) Prior Publication Data
US 2019/0291391 A1    Sep. 26, 2019

(30) Foreign Application Priority Data
Dec. 26, 2016  (JP) .................................. 2016-251093

(51) Int. Cl.
*B32B 25/14* (2006.01)
*B32B 5/02* (2006.01)
*B32B 25/10* (2006.01)

(52) U.S. Cl.
CPC .............. *B32B 25/14* (2013.01); *B32B 5/022* (2013.01); *B32B 25/10* (2013.01);
(Continued)

(58) Field of Classification Search
CPC ............ B32B 2307/51; B32B 2555/00; B32B 2555/02; B32B 25/10; B32B 25/14; B32B 5/022
See application file for complete search history.

(56) References Cited

U.S. PATENT DOCUMENTS 4,798,602 A    1/1989  Laus
2007/0128427 A1    6/2007  Suzuki et al.
(Continued)

FOREIGN PATENT DOCUMENTS

CN    102105527 A    6/2011
JP    5-295177 A    11/1993
(Continued)

OTHER PUBLICATIONS

International Search Report for PCT/JP2017/043244 dated Feb. 27, 2018 (PCT/ISA/210).
(Continued)

*Primary Examiner* — Lawrence D Ferguson
(74) *Attorney, Agent, or Firm* — Sughrue Mion, PLLC

(57) ABSTRACT

Provided is a stretchable film that can prevent a delivery failure when delivered from a winding body. Also provided is a stretchable laminate including such stretchable film. Still also provided is an article including such stretchable laminate. The stretchable film of the present invention includes a laminated film of a plurality of elastomer layers, wherein the stretchable film includes an elastomer layer (A1), an elastomer layer (B), and an elastomer layer (A2) in the stated order, wherein the elastomer layer (A1) and the elastomer layer (A2) are provided as outer layers, and wherein each of the elastomer layer (A1) and the elastomer layer (A2) contains a fatty acid amide.

26 Claims, 4 Drawing Sheets

(52) U.S. Cl.
    CPC ....... *B32B 2307/51* (2013.01); *B32B 2555/00* (2013.01); *B32B 2555/02* (2013.01)

(56) References Cited

U.S. PATENT DOCUMENTS

| | | |
|---|---|---|
| 2008/0045917 A1 | 2/2008 | Autran et al. |
| 2011/0118400 A1 | 5/2011 | Neuteboom |
| 2012/0088423 A1* | 4/2012 | Oda .................. B32B 5/022 |
| | | 442/381 |
| 2016/0159031 A1 | 6/2016 | Ikishima et al. |
| 2017/0203554 A1 | 7/2017 | Takahashi et al. |
| 2018/0127620 A1 | 5/2018 | Uchida et al. |

FOREIGN PATENT DOCUMENTS

| | | |
|---|---|---|
| JP | 2008-169304 A | 7/2008 |
| JP | 2009-506198 A | 2/2009 |
| JP | 2011-528733 A | 11/2011 |
| JP | 2015-020317 A | 2/2015 |
| JP | 2016-203618 A | 12/2016 |
| WO | 2015/196459 A1 | 12/2015 |
| WO | 2016/013577 A1 | 1/2016 |
| WO | 2016/048857 A1 | 3/2016 |
| WO | 2016/048866 A1 | 3/2016 |

OTHER PUBLICATIONS

Extended European Search Report dated Jun. 19, 2020, from the European Patent Office in application No. 17888257.7.
First Office Action dated Aug. 20, 2020 from the State Intellectual Property Office of the P.R.C. in Application No. 201780080886.7.

\* cited by examiner

STRETCHABLE FILM, STRETCHABLE LAMINATE AND ARTICLE COMPRISING SAME

TECHNICAL FIELD

The present invention relates to a stretchable film, a stretchable laminate, and an article including the stretchable laminate.

BACKGROUND ART

Various stretchable laminates are proposed for an article such as a sanitary article, for example, a diaper or a mask.

As such member, a stretchable laminate including a stretchable film and a non-woven fabric layer arranged on at least one side of the stretchable film has been proposed (Patent Literature 1).

The stretchable film is liable to cause a delivery failure resulting from its stretchability, such as blocking, when delivered from a winding body.

CITATION LIST

Patent Literature

[PTL 1] JP 2015-020317 A

SUMMARY OF INVENTION

Technical Problem

The present invention has been made to solve the conventional problem, and an object of the present invention is to provide a stretchable film that can prevent a delivery failure when delivered from a winding body. Another object of the present invention is to provide a stretchable laminate including such stretchable film. Still another object of the present invention is to provide an article including such stretchable laminate.

Solution to Problem

A stretchable film according to one embodiment of the present invention includes a laminated film of a plurality of elastomer layers, wherein the stretchable film includes an elastomer layer (A1), an elastomer layer (B), and an elastomer layer (A2) in the stated order, wherein the elastomer layer (A1) and the elastomer layer (A2) are provided as outer layers, and wherein each of the elastomer layer (A1) and the elastomer layer (A2) contains a fatty acid amide.

In one embodiment, the stretchable film according to the embodiment of the present invention is formed of the elastomer layer (A1), the elastomer layer (B), and the elastomer layer (A2).

In one embodiment, a content of the fatty acid amide in the elastomer layer (A1) and a content of the fatty acid amide in the elastomer layer (A2) are each from 0.5 wt % to 5 wt %.

In one embodiment, the fatty acid amide includes a fatty acid amide having a molecular weight of 750 or less.

In one embodiment, the fatty acid amide includes at least one kind selected from oleic acid amide, behenic acid amide, ethylenebis oleic acid amide, and ethylenebis behenic acid amide.

In one embodiment, each of the elastomer layer (A1) and the elastomer layer (A2) contains calcium carbonate.

In one embodiment, a content of the calcium carbonate in the elastomer layer (A1) and a content of the calcium carbonate in the elastomer layer (A2) are each from 1 wt % to 50 wt %.

In one embodiment, each of the elastomer layer (A1) and the elastomer layer (A2) contains a metal soap.

In one embodiment, a content of the metal soap in the elastomer layer (A1) and a content of the metal soap in the elastomer layer (A2) are each from 0.01 wt % to 5 wt %.

In one embodiment, the metal soap includes at least one kind selected from a fatty acid calcium, a fatty acid magnesium, and a fatty acid zinc.

In one embodiment, each of the elastomer layer (A1) and the elastomer layer (A2) contains an olefin-based elastomer.

In one embodiment, the elastomer layer (B) contains an olefin-based elastomer.

In one embodiment, the olefin-based elastomer includes an α-olefin-based elastomer.

In one embodiment, the α-olefin-based elastomer includes at least one kind selected from an ethylene-based elastomer, a propylene-based elastomer, and a 1-butene-based elastomer.

A stretchable laminate according to one embodiment of the present invention includes: the stretchable film according to the embodiment of the present invention; and a non-woven fabric layer arranged on at least one side of the stretchable film.

An article according to one embodiment of the present invention includes the stretchable laminate according to the embodiment of the present invention.

DESCRIPTION OF EMBODIMENTS

<<<<Stretchable Film>>>>

A stretchable film of the present invention includes a laminated film of a plurality of elastomer layers, wherein the stretchable film includes an elastomer layer (A1), an elastomer layer (B), and an elastomer layer (A2) in the stated order, and wherein the elastomer layer (A1) and the elastomer layer (A2) are provided as outer layers.

When the stretchable film of the present invention includes the elastomer layer (A1), the elastomer layer (B), and the elastomer layer (A2) in the stated order, and the elastomer layer (A1) and the elastomer layer (A2) are provided as the outer layers, the film may include any appropriate other layer to the extent that the effects of the present invention are not impaired. The number of such other layers may be only one, or may be two or more.

Any appropriate layer number may be adopted as the number of the elastomer layers that the stretchable film of the present invention includes to the extent that the effects of the present invention are not impaired. Such layer number is preferably from 2 to 5, more preferably from 2 to 4, still more preferably from 2 to 3, particularly preferably 3.

Figure 1:
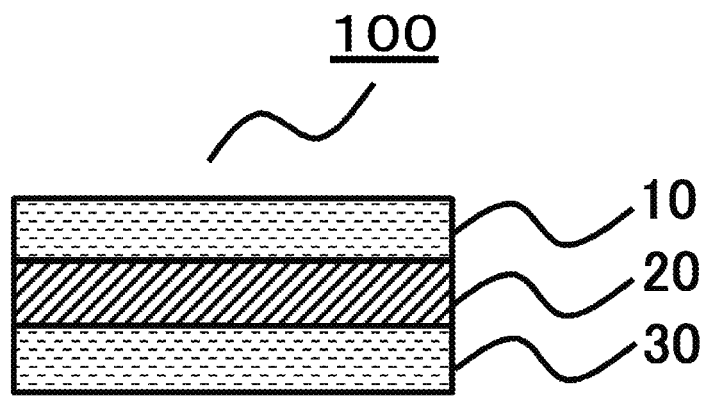
FIG. 1 is a schematic sectional view of a stretchable film according to one embodiment of the present invention.

FIG. 1 is a schematic sectional view of a stretchable film according to one embodiment of the present invention. A stretchable film 100 illustrated in FIG. 1 is formed of an elastomer layer (A1) 10, an elastomer layer (B) 20, and an elastomer layer (A2) 30. Such embodiment as illustrated in FIG. 1, that is, a laminated film formed of the elastomer layer (A1) 10, the elastomer layer (B) 20, and the elastomer layer (A2) 30 is a preferred embodiment of the stretchable film of the present invention.

In the stretchable film of the present invention, each of the elastomer layer (A1) and the elastomer layer (A2) contains a fatty acid amide. When each of the elastomer layer (A1) and the elastomer layer (A2) contains the fatty acid amide, a stretchable film that can prevent a delivery failure when delivered from a winding body can be provided.

The number of kinds of the fatty acid amides to be incorporated into the elastomer layer (A1) and the elastomer layer (A2) may be only one, or may be two or more.

In the stretchable film of the present invention, the content of the fatty acid amide in the elastomer layer (A1) and the content of the fatty acid amide in the elastomer layer (A2) are each preferably from 0.5 wt % to 5 wt %, more preferably from 0.75 wt % to 5 wt %, still more preferably from 0.75 wt % to 4 wt %, particularly preferably from 0.75 wt % to 3 wt %, most preferably from 1 wt % to 2.5 wt %. When the content of the fatty acid amide in the elastomer layer (A1) and the content of the fatty acid amide in the elastomer layer (A2) each fall within the range, a stretchable film that can further prevent a delivery failure when delivered from a winding body can be provided.

In the stretchable film of the present invention, the fatty acid amide is preferably a fatty acid amide having a molecular weight of 750 or less, more preferably a fatty acid amide having a molecular weight of 700 or less, still more preferably a fatty acid amide having a molecular weight of 600 or less, particularly preferably a fatty acid amide having a molecular weight of 500 or less, most preferably a fatty acid amide having a molecular weight of 400 or less because the effects of the present invention may be expressed to a larger extent. Specifically, such fatty acid amide is preferably at least one kind selected from a fatty acid amide and a fatty acid bisamide each formed of a fatty acid having 12 to 24 carbon atoms, more preferably at least one kind selected from oleic acid amide, behenic acid amide, ethylenebis oleic acid amide, and ethylenebis behenic acid amide, still more preferably at least one kind selected from oleic acid amide, behenic acid amide, and ethylenebis oleic acid amide, particularly preferably at least one kind selected from oleic acid amide and behenic acid amide.

In the stretchable film of the present invention, the elastomer layer (A1) and the elastomer layer (A2) each preferably contain a metal soap. When each of the elastomer layer (A1) and the elastomer layer (A2) contains the metal soap, the occurrence of die drool in an extrusion die slip in the production of the stretchable film of the present invention by extrusion molding can be effectively prevented.

The number of kinds of the metal soaps that may be incorporated into the elastomer layer (A1) and the elastomer layer (A2) may be only one, or may be two or more.

In the stretchable film of the present invention, the content of the metal soap in the elastomer layer (A1) and the content of the metal soap in the elastomer layer (A2) are each preferably from 0.01 wt % to 5 wt %, more preferably from 0.05 wt % to 4 wt %, still more preferably from 0.1 wt % to 3.5 wt %, particularly preferably from 0.2 wt % to 3 wt %, most preferably from 0.25 wt % to 2.5 wt %. When the content of the metal soap in the elastomer layer (A1) and the content of the metal soap in the elastomer layer (A2) each fall within the range, the occurrence of die drool in an extrusion die slip in the production of the stretchable film of the present invention by extrusion molding can be more effectively prevented.

In the stretchable film of the present invention, the metal soap is preferably a polyvalent metal salt of a long-chain fatty acid or an organic acid because the effects of the present invention may be expressed to a larger extent. Specifically, the metal soap is preferably at least one kind selected from a fatty acid alkaline earth metal and a fatty acid zinc, more preferably at least one kind selected from a fatty acid calcium, a fatty acid magnesium, and a fatty acid zinc, still more preferably at least one kind selected from a fatty acid calcium having 7 to 22 carbon atoms, a fatty acid magnesium having 7 to 22 carbon atoms, and a fatty acid zinc having 7 to 22 carbon atoms, particularly preferably at least one kind selected from a fatty acid calcium having 12 to 18 carbon atoms, a fatty acid magnesium having 12 to 18 carbon atoms, and a fatty acid zinc having 12 to 18 carbon atoms, most preferably at least one kind selected from calcium stearate, magnesium stearate, and zinc stearate.

In the stretchable film of the present invention, the elastomer layer (A1) and the elastomer layer (A2) each preferably contain calcium carbonate. When each of the elastomer layer (A1) and the elastomer layer (A2) contains calcium carbonate, the surfaces of the outer layers of the stretchable film of the present invention can be effectively roughened. The stretchable film whose surfaces have been effectively roughened hardly causes a delivery failure, such as blocking, when delivered from a winding body because the area of contact between different portions of the film reduces at the time of the production of the winding body. In addition, when the film is incorporated into an article such as a sanitary article, for example, a diaper or a mask, the film is hardly conspicuous and the article hardly appears to be wet.

The number of kinds of calcium carbonate that may be incorporated into the elastomer layer (A1) and the elastomer layer (A2) may be only one, or may be two or more.

In the stretchable film of the present invention, the content of calcium carbonate in the elastomer layer (A1) and the content of calcium carbonate in the elastomer layer (A2) are each preferably from 1 wt % to 50 wt %, more preferably from 2 wt % to 45 wt %, still more preferably from 3 wt % to 40 wt %, particularly preferably from 4 wt % to 35 wt %, most preferably from 5 wt % to 30 wt %. When the content of calcium carbonate in the elastomer layer (A1) and the content of calcium carbonate in the elastomer layer (A2) each fall within the range, the surfaces of the outer layers of the stretchable film of the present invention can be more effectively roughened.

In the stretchable film of the present invention, the elastomer layer (A1) and the elastomer layer (A2) each preferably contain an olefin-based elastomer. When each of the elastomer layer (A1) and the elastomer layer (A2) contains the olefin-based elastomer, the heat stability of the stretchable film of the present invention is improved, and hence heat decomposition at the time of film formation in the production of the stretchable film of the present invention may be suppressed. In addition, when each of the elastomer layer (A1) and the elastomer layer (A2) contains the olefin-based elastomer, the storage stability of the stretchable film of the present invention is improved, and hence the fluctuation of values for physical properties during the storage of the stretchable film of the present invention may be suppressed. Further, when each of the elastomer layer (A1) and the elastomer layer (A2) contains the olefin-based elastomer, extrusion molding can be performed by using fewer kinds of resins in the production of the elastomer layer (A1) and the elastomer layer (A2). Accordingly, for example, the need for the production of a master batch is eliminated, and hence processing cost for the film can be suppressed.

The number of kinds of the olefin-based elastomers that may be incorporated into the elastomer layer (A1) and the elastomer layer (A2) may be only one, or may be two or more.

In the stretchable film of the present invention, the content of the olefin-based elastomer in the elastomer layer (A1) and the content of the olefin-based elastomer in the elastomer layer (A2) are each preferably from 50 wt % to 100 wt %, more preferably from 70 wt % to 100 wt %, still more preferably from 80 wt % to 100 wt %, particularly preferably from 90 wt % to 100 wt %, most preferably from 95 wt % to 100 wt %. When the content of the olefin-based elastomer in the elastomer layer (A1) and the content of the olefin-based elastomer in the elastomer layer (A2) each fall within the range, the heat stability and storage stability of the stretchable film of the present invention may be further improved.

In the stretchable film of the present invention, the elastomer layer (B) preferably contains an olefin-based elastomer. When the elastomer layer (B) contains the olefin-based elastomer, the heat stability of the stretchable film of the present invention is improved, and hence the heat decomposition at the time of the film formation in the production of the stretchable film of the present invention may be suppressed. In addition, when the elastomer layer (B) contains the olefin-based elastomer, the storage stability of the stretchable film of the present invention is improved, and hence the fluctuation of the values for the physical properties during the storage of the stretchable film of the present invention may be suppressed. Further, when the elastomer layer (B) contains the olefin-based elastomer, extrusion molding can be performed by using fewer kinds of resins in the production of the elastomer layer (B). Accordingly, for example, the need for the production of a master batch is eliminated, and hence the processing cost can be suppressed.

The number of kinds of the olefin-based elastomers that may be incorporated into the elastomer layer (B) may be only one, or may be two or more.

In the stretchable film of the present invention, the content of the olefin-based elastomer in the elastomer layer (B) is preferably from 50 wt % to 100 wt %, more preferably from 70 wt % to 100 wt %, still more preferably from 80 wt % to 100 wt %, particularly preferably from 90 wt % to 100 wt %, most preferably from 95 wt % to 100 wt %. When the content of the olefin-based elastomer in the elastomer layer (B) falls within the range, the heat stability and storage stability of the stretchable film of the present invention may be further improved.

In the stretchable film of the present invention, at least one kind of the olefin-based elastomers that may be incorporated into the elastomer layer (B) is preferably an olefin-based elastomer identical in kind to at least one kind of the olefin-based elastomers that may be incorporated into the elastomer layer (A1) and the elastomer layer (A2) because the effects of the present invention may be expressed to a larger extent.

In the stretchable film of the present invention, the olefin-based elastomer that may be incorporated into the elastomer layer (B) is preferably a blend of two kinds of olefin-based elastomers because the effects of the present invention may be expressed to a larger extent.

Examples of the olefin-based elastomer include an olefin block copolymer, an olefin random copolymer, an ethylene copolymer, a propylene copolymer, an ethylene olefin block copolymer, a propylene olefin block copolymer, an ethylene olefin random copolymer, a propylene olefin random copolymer, an ethylene propylene random copolymer, an ethylene (1-butene) random copolymer, an ethylene (1-pentene) olefin block copolymer, an ethylene (1-hexene) random copolymer, an ethylene (1-heptene) olefin block copolymer, an ethylene (1-octene) olefin block copolymer, an ethylene (1-nonene) olefin block copolymer, an ethylene (1-decene) olefin block copolymer, a propylene ethylene olefin block copolymer, an ethylene ($\alpha$-olefin) copolymer, an ethylene ($\alpha$-olefin) random copolymer, an ethylene ($\alpha$-olefin) block copolymer, and combinations thereof.

The olefin-based elastomer has a density of preferably from 0.890 $g/cm^3$ to 0.830 $g/cm^3$, more preferably from 0.888 $g/cm^3$ to 0.835 $g/cm^3$, still more preferably from 0.886 $g/cm^3$ to 0.835 $g/cm^3$, particularly preferably from 0.885 $g/cm^3$ to 0.840 $g/cm^3$, most preferably from 0.885 $g/cm^3$ to 0.845 $g/cm^3$.

The olefin-based elastomer has a MFR at 230° C. and 2.16 kgf of preferably from 1.0 g/10 min to 25.0 g/10 min, more preferably from 2.0 g/10 min to 23.0 g/10 min, still more preferably from 2.0 g/10 min to 21.0 g/10 min, particularly preferably from 2.0 g/10 min to 20.0 g/10 min, most preferably from 2.0 g/10 min to 19.0 g/10 min.

The olefin-based elastomer is specifically preferably an $\alpha$-olefin-based elastomer. That is, the $\alpha$-olefin-based elastomer is a copolymer of two or more kinds of $\alpha$-olefins and has elastomer characteristics. Of such $\alpha$-olefin-based elastomers, at least one kind selected from an ethylene-based elastomer, a propylene-based elastomer, and a 1-butene-based elastomer is more preferred. When any such $\alpha$-olefin-based elastomer is adopted as the olefin-based elastomer, the heat stability of the stretchable film of the present invention is improved, and hence the heat decomposition at the time of the film formation in the production of the stretchable film of the present invention may be suppressed. In addition, when any such $\alpha$-olefin-based elastomer is adopted as the olefin-based elastomer, the storage stability of the stretchable film of the present invention is improved, and hence the fluctuation of the values for the physical properties during the storage of the stretchable film of the present invention may be suppressed. Further, when any such $\alpha$-olefin-based elastomer is adopted as the olefin-based elastomer, extrusion molding can be performed by using fewer kinds of resins in the production of the respective elastomer layers. Accordingly, for example, the need for the production of a master batch is eliminated, and hence the processing cost can be suppressed.

Of the $\alpha$-olefin-based elastomers, a propylene-based elastomer is particularly preferred. When the propylene-based elastomer is adopted as the $\alpha$-olefin-based elastomer, the heat stability of the stretchable film of the present invention is further improved, and hence the heat decomposition at the time of the film formation in the production of the stretchable film of the present invention may be further suppressed. In addition, when the propylene-based elastomer is adopted as the $\alpha$-olefin-based elastomer, the storage stability of the stretchable film of the present invention is further improved, and hence the fluctuation of the values for the physical properties during the storage of the stretchable film of the present invention may be further suppressed. Further, when the propylene-based elastomer is adopted as the $\alpha$-olefinbased elastomer, extrusion molding can be performed by using even fewer kinds of resins in the production of the respective elastomer layers. Accordingly, for example, the need for the production of a master batch is eliminated, and hence the processing cost can be further suppressed.

The α-olefin-based elastomer is also available as a commercial product. Examples of such commercial product include some products in the "Vistamaxx" (trademark) series (e.g., Vistamaxx 6202, Vistamaxx 7010, and Vistamaxx 3000) manufactured by Exxon Mobil Corporation, and some products in the "Tafmer" (trademark) series (e.g., Tafmer PN-3560) manufactured by Mitsui Chemicals, Inc.

The α-olefin-based elastomer is preferably produced by using a metallocene catalyst. When an α-olefin-based elastomer produced by using the metallocene catalyst is adopted as the α-olefin-based elastomer, the heat stability of the stretchable film of the present invention is further improved, and hence the heat decomposition at the time of the film formation in the production of the stretchable film of the present invention may be further suppressed. In addition, when the α-olefin-based elastomer produced by using the metallocene catalyst is adopted as the α-olefin-based elastomer, the storage stability of the stretchable film of the present invention is further improved, and hence the fluctuation of the values for the physical properties during the storage of the stretchable film of the present invention may be further suppressed. Further, when the α-olefin-based elastomer produced by using the metallocene catalyst is adopted as the α-olefin-based elastomer, extrusion molding can be performed by using even fewer kinds of resins in the production of the respective elastomer layers. Accordingly, for example, the need for the production of a master batch is eliminated, and hence the processing cost can be further suppressed.

In the stretchable film of the present invention, the elastomer layer (B) may contain any other elastomer resin except the olefin-based elastomer. Examples of such other elastomer resin include a styrene-based elastomer, a vinyl chloride-based elastomer, a urethane-based elastomer, an ester-based elastomer, and an amide-based elastomer. Such other elastomer resins may be used alone or in combination thereof.

Each of the elastomer layers (A1), (A2), and (B) may contain any appropriate other component to the extent that the effects of the present invention are not impaired. Examples of such other component include any other polymer, a tackifier, a plasticizer, an antidegradant, a pigment, a dye, an antioxidant, an antistatic agent, a lubricant, a foaming agent, a heat stabilizer, a light stabilizer, an inorganic filler, and an organic filler. Those components may be used alone or in combination thereof. The content of the other component in each of the elastomer layers (A1), (A2), and (B) is preferably 10 wt % or less, more preferably 7 wt % or less, still more preferably 5 wt % or less, particularly preferably 2 wt % or less, most preferably 1 wt % or less.

The thickness of the elastomer layer (A1) is preferably from 1 μm to 15 μm, more preferably from 2 μm to 15 μm, still more preferably from 2 μm to 12.5 μm, particularly preferably from 2 μm to 10 μm, most preferably from 2 μm to 8 μm because the effects of the present invention may be expressed to a larger extent.

The thickness of the elastomer layer (A2) is preferably from 1 μm to 15 μm, more preferably from 2 μm to 15 μm, still more preferably from 2 μm to 12.5 μm, particularly preferably from 2 μm to 10 μm, most preferably from 2 μm to 8 μm because the effects of the present invention may be expressed to a larger extent.

The thickness of the elastomer layer (B) is preferably from 18 μm to 148 μm, more preferably from 21 μm to 121 μm, still more preferably from 26 μm to 96 μm, particularly preferably from 31 μm to 81 μm, most preferably from 36 μm to 66 μm because the effects of the present invention may be expressed to a larger extent.

The thickness of the stretchable film of the present invention is preferably from 20 μm to 150 μm, more preferably from 25 μm to 125 μm, still more preferably from 30 μm to 100 μm, particularly preferably from 35 μm to 85 μm, most preferably from 40 μm to 70 μm because the effects of the present invention may be expressed to a larger extent.

The stretchable film of the present invention may be produced by any appropriate method to the extent that the effects of the present invention are not impaired. Such production method is preferably, for example, a method involving performing multilayer extrusion from the T-die of an extruder to produce the film.

<<<<Stretchable Laminate>>>>

A stretchable laminate of the present invention includes: the stretchable film of the present invention; and a non-woven fabric layer arranged on at least one side of the stretchable film.

The stretchable laminate of the present invention may include any appropriate other layer to the extent that the effects of the present invention are not impaired as long as the laminate includes the non-woven fabric layer on at least one side of the stretchable film of the present invention. The number of such other layers may be only one, or may be two or more.

Figure 2:
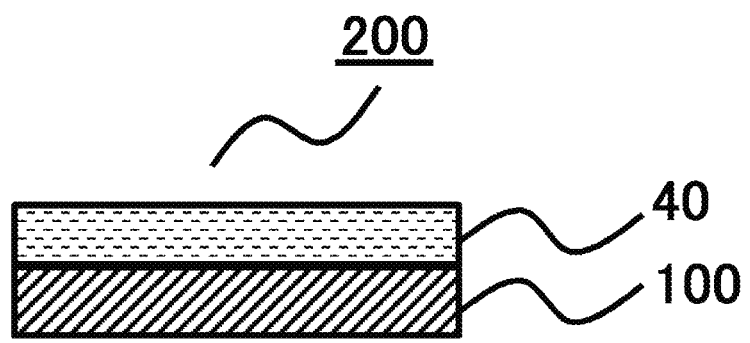
FIG. 2 is a schematic sectional view of a stretchable laminate according to one embodiment of the present invention.

FIG. 2 is a schematic sectional view of a stretchable laminate according to one embodiment of the present invention. A stretchable laminate 200 illustrated in FIG. 2 includes the stretchable film 100 and a non-woven fabric layer 40 arranged only on one side of the stretchable film 100. A material for bonding the stretchable film 100 and the non-woven fabric layer 40 may be present therebetween. Examples of such material include an adhesive, a pressure-sensitive adhesive, and a hot-melt pressure-sensitive adhesive.

Figure 3:
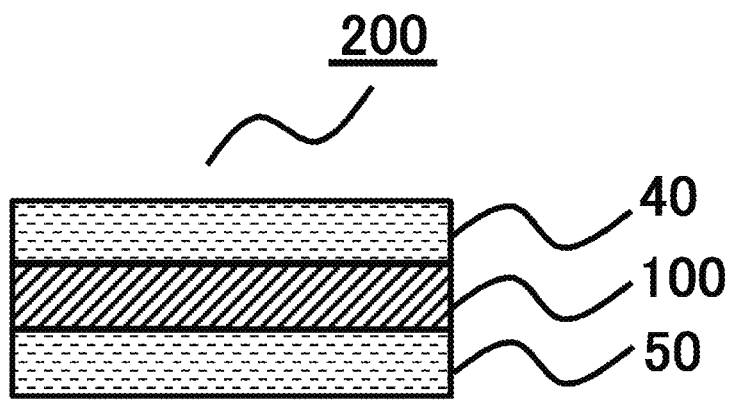
FIG. 3 is a schematic sectional view of another stretchable laminate according to one embodiment of the present invention.

FIG. 3 is a schematic sectional view of another stretchable laminate according to one embodiment of the present invention. The stretchable laminate 200 illustrated in FIG. 3 includes the stretchable film 100, the non-woven fabric layer 40 arranged on one side of the stretchable film 100, and a non-woven fabric layer 50 arranged on a side of the stretchable film 100 opposite to the non-woven fabric layer 40. A material for bonding the stretchable film 100 and the non-woven fabric layer 40, and/or the stretchable film 100 and the non-woven fabric layer 50 may be present therebetween. Examples of such material include an adhesive, a pressure-sensitive adhesive, and a hot-melt pressure-sensitive adhesive.

The thickness of the stretchable laminate of the present invention is preferably from 1.0 mm to 0.1 mm, more preferably from 0.8 mm to 0.15 mm, still more preferably from 0.6 mm to 0.15 mm, particularly preferably from 0.5 mm to 0.2 mm, most preferably from 0.45 mm to 0.2 mm, though the thickness depends on the thickness of the stretchable film and the thickness of the non-woven fabric layer. When the thickness of the stretchable laminate of the present invention falls within such range, the laminate can be easily used as a member to be used in an article such as a sanitary article, for example, a diaper or a mask.

<<Non-Woven Fabric Layer>>

Any appropriate non-woven fabric layer may be adopted as the non-woven fabric layer to the extent that the effects of the present invention are not impaired. The number of kinds of non-woven fabrics forming the non-woven fabric layer may be only one, or may be two or more.

Examples of the non-woven fabric forming the non-woven fabric layer include a spunbond non-woven web, a raised non-woven fabric (e.g., a non-woven fabric obtained by a thermal bonding method, a bonding and joining method, or a spunlace method), a melt-blown non-woven web, a spunlace non-woven web, a spunbond melt-blown spunbond non-woven web, a spunbond melt-blown melt-blown spunbond non-woven web, an unjoined non-woven web, an electrospun non-woven web, a flashspun non-woven web (e.g., TYVEK™ from DuPont), and a carded non-woven fabric.

The non-woven fabric forming the non-woven fabric layer may contain polyolefin fibers, such as polypropylene, polyethylene, polyester, polyamide, polyurethane, an elastomer, rayon, cellulose, acryl, copolymers thereof, blends thereof, or mixtures thereof.

The non-woven fabric forming the non-woven fabric layer may contain fibers serving as a uniform structural body, or may contain a two-component structural body, such as a sheath-core structure, a side-by-side structure, a sea-island structure, or any other two-component structure. Detailed descriptions of the non-woven fabric can be found in, for example, "Nonwoven Fabric Primer and Reference Sampler," E. A. Vaughn, Association of the Nonwoven Fabrics Industry, Third Edition (1992).

The basis weight of the non-woven fabric forming the non-woven fabric layer is preferably 150 gsm or less, more preferably 100 gsm or less, still more preferably 50 gsm or less, particularly preferably from 10 gsm to 30 gsm.

<<Production of Stretchable Laminate of the Present Invention>>

At the time of the production of the stretchable laminate of the present invention, in the case where the stretchable film and the non-woven fabric layer are directly laminated (e.g., in the case of FIG. 2 or FIG. 3), the stretchable film and the non-woven fabric layer need to be bonded to each other. A method for such bonding is, for example, (1) a method involving laminating the stretchable film and the non-woven fabric layer separately drawn from a rolled body, (2) a method involving simultaneously extruding and laminating the stretchable film and the non-woven fabric layer, (3) a method involving bonding the stretchable film and the non-woven fabric layer each of which has been separately prepared with various adhesives, (4) a method involving forming the non-woven fabric layer on the stretchable film, which has been formed by any appropriate method, according to a melt-blown method or the like, or (5) the heat lamination or ultrasonic welding of the stretchable film and the non-woven fabric layer.

A hot-melt pressure-sensitive adhesive is preferably used in the bonding of the stretchable film and the non-woven fabric layer. When the hot-melt pressure-sensitive adhesive is used, the need for the addition of a tackifier as a component for the stretchable film is reduced. Accordingly, for example, the extrusion stability of the film is improved, a problem in that the tackifier adheres to a molding roll can be suppressed, and the problem of the contamination of a production line for the laminate due to, for example, contamination with volatile matter resulting from the tackifier can be suppressed.

In the case where the hot-melt pressure-sensitive adhesive is used in the bonding of the stretchable film and the non-woven fabric layer, for example, when the method (1) is applied, the top of the non-woven fabric layer separately drawn from the rolled body only needs to be coated with the hot-melt pressure-sensitive adhesive before the lamination with the stretchable film.

Figure 4:
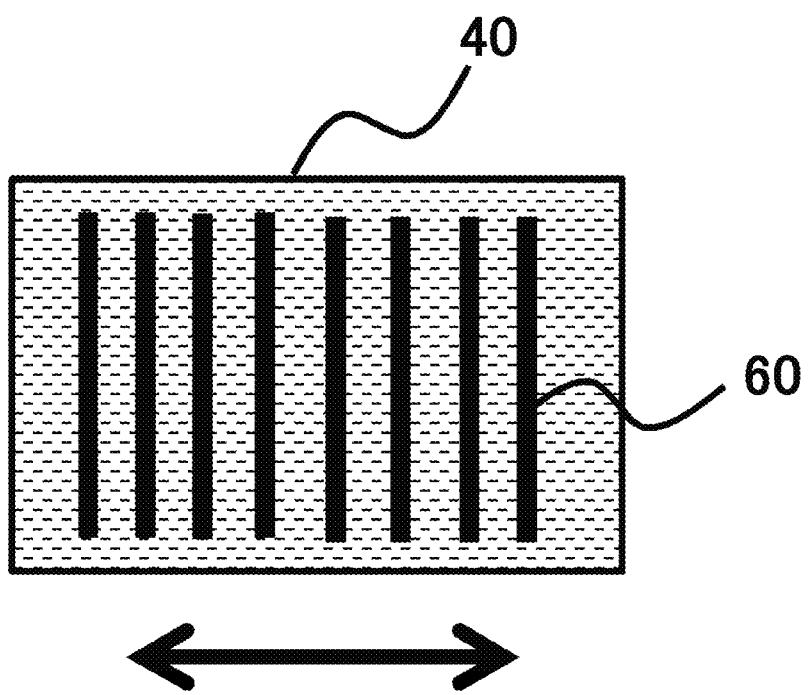
FIG. 4 is a schematic view of a state in which the top of a non-woven fabric layer is coated with a hot-melt pressure-sensitive adhesive in the flow direction of a production line in a stripe manner when viewed from an upper surface.

When the hot-melt pressure-sensitive adhesive is used in the bonding of the stretchable film and the non-woven fabric layer, an entire surface on the non-woven fabric layer is not required to be coated with the hot-melt pressure-sensitive adhesive. For example, the top of the non-woven fabric layer 40 only needs to be coated with a hot-melt pressure-sensitive adhesive 60 in the flow direction of the production line in a stripe manner as illustrated in FIG. 4, or the pressure-sensitive adhesive only needs to be applied onto the layer in a spot manner. When the top of the non-woven fabric layer is coated with the hot-melt pressure-sensitive adhesive in a stripe manner, a site where the hot-melt pressure-sensitive adhesive is present and a site where the pressure-sensitive adhesive is absent are formed in a stripe manner, and hence the stretchability of the stretchable laminate may be further improved particularly in a direction perpendicular to the stripes (direction indicated by an arrow in FIG. 4).

The stretchable laminate of the present invention can be subjected to a treatment called preliminary stretching or an activation treatment after the lamination of the stretchable film and the non-woven fabric layer. Specifically, a stretching treatment can be performed in the widthwise direction of the stretchable laminate, or a treatment in which a fiber structure in a partial region of the non-woven fabric layer is mechanically broken can be performed. The performance of any such treatment enables the stretchable laminate to be stretched with a smaller force.

<<Application of Stretchable Laminate of the Present Invention>>

The stretchable laminate of the present invention can be used in any appropriate article in which the effects of the present invention can be effectively utilized. That is, the article of the present invention includes the stretchable laminate of the present invention. A typical example of such article is a sanitary article. Examples of such sanitary article include a diaper (in particular, an ear portion of a disposable diaper), a supporter, and a mask.

EXAMPLES

The present invention is hereinafter specifically described by way of Examples. However, the present invention is by no means limited to these Examples. Test and evaluation methods in Examples and the like are as described below. In addition, "part(s)" means "part(s) by weight" and "%" means "wt %" unless otherwise stated.

<T-Die Extrudability>

At the time of T-die extrusion molding, a case in which the molding could not be continuously performed for 5 hours or more without any contamination owing to the occurrence of contamination, such as die drool due to an oil serving as a low-molecular weight component or an inorganic component separated from an extruded resin, at a T-die ejection port was indicated by "NG", and a case in which the molding was able to be continuously performed for 5 hours or more without any contamination was indicated by "OK".

<Film Delivery Test>

A stretchable film extruded from a T-die by T-die extrusion molding was formed into a film having a width of 2,000 mm. While the film was slit at a width of 200 mm, the film was wound so that the length of the wound film became 4,000 m. Thus, a roll (winding body) was obtained. After the produced roll had been left to stand at room temperature for 24 hours or more, the film was delivered at each of the following speeds: a low speed of 50 m/min, a middle speed of 100 m/min, and a high speed of 250 m/min. A case in which the shrinkage ratio of the stretchable film at the time of the delivery was less than 5%, and its entire length of 4,000 m was able to be delivered was indicated by Symbol "○", a case in which the shrinkage ratio of the stretchable film at the time of the delivery was 5% or more, but its entire length of 4,000 m was able to be delivered was indicated by Symbol "Δ", and a case in which the stretchable film ruptured before the completion of the delivery of its entire length of 4,000 m was indicated by Symbol "×".

<Test for Holding Force at 40° C. (Evaluation of Presence or Absence of Delamination)>

667 Parts of a propylene-1-butene copolymer (manufactured by REXtac, LLC, product name: REXTAC RT 2788), 520 parts of a tackifier (manufactured by Kolon Industries, Inc., product name: SUKOREZ SU-100 S), 100 parts of liquid paraffin (manufactured by Petro yag, product name: White Oil Pharma Oyster 259), and 13 parts of an antioxidant (manufactured by BASF, product name: Irganox 1010) were compounded to provide a hot-melt pressure-sensitive adhesive. A sheet obtained by applying the hot-melt pressure-sensitive adhesive to a film made of OPP (35 μm) at 15 g/m$^2$ was cut into a width of 25 mm. The sheet was bonded to the non-woven fabric surface (one surface side, entirely applied portion) of each of stretchable laminates produced in Examples and Comparative Examples so as to measure 25 mm wide by 15 mm long, and the sheet was crimped onto the surface by reciprocating a load of 1 kg twice. After the crimping, the resultant product was left at rest at room temperature for 10 minutes, and was then left at rest under an environment at 40° C. for 30 minutes. The product was cut into a width of 50 mm in the CD direction of the film, and was set in a holding force testing machine, followed by the application of a load of 1 kg to its OPP film side. A case in which a delamination phenomenon occurred 2 hours after the application to cause the product to fall was indicated by "NG", and a case in which the product did not delaminate and fall was indicated by "OK".

<Elasticity Test>

A stretchable laminate obtained in any one of Examples and Comparative Examples was cut into a width of 30 mm in the CD direction, and only a stripe portion was set in a tension testing machine (manufactured by Shimadzu Corporation: AG-20kNG) at a distance between chucks of 40 mm. The resultant was extended by 100% at a tension speed of 300 mm/min. After having been extended by 100%, the laminate was fixed in an extended state and held at room temperature for 10 minutes. After a lapse of 10 minutes, the laminate was released from the extended state, and the initial distance between the chucks, i.e., 40 mm (A) and the width of the film after the test, i.e., (40+α) mm (B) were measured. After that, a fluctuation ratio was calculated from the expression "[{(B)−(A)}/(A)]×100." A case in which the fluctuation ratio was more than 20% was indicated by Symbol "×", and a case in which the fluctuation ratio was less than 20% was indicated by Symbol "○".

<Molding Conditions>

In each of Examples and Comparative Examples, a stretchable film was formed by extrusion molding with an extrusion T-die molding machine including three layers in two types (A layer/B layer/A layer). The molding was performed under the following extrusion temperature conditions.

A layer: 200° C.
B layer: 200° C.
Die temperature: 200° C.

A non-woven fabric (PP carded type, basis weight=24 gsm) was bonded to each of both surfaces of the stretchable film extruded from a T-die with a roll. Thus, a stretchable laminate was obtained. At this time, a hot-melt pressure-sensitive adhesive was applied to a side to which the non-woven fabric was bonded so that a portion (A) in which the hot-melt pressure-sensitive adhesive was entirely applied (7 g/m$^2$) over a width of 30 mm and a portion (B) in which the hot-melt pressure-sensitive adhesive was applied (15 g/m$^2$) in a stripe manner (width of the pressure-sensitive adhesive: 1 mm, interval: 1 mm) over a width of 41 mm were alternately present.

Production Example 1

As shown in Table 1, 600 parts of a propylene-based elastomer (manufactured by Exxon Mobil Corporation, product name: Vistamaxx 8380), 400 parts of a tackifier (manufactured by Exxon Mobil Corporation, product name: Escorez 5400), and 10 parts of an antioxidant (manufactured by BASF, product name: Irganox 1010) were compounded to provide a hot-melt pressure-sensitive adhesive (Olefin 1).

Production Example 2

As shown in Table 1, 600 parts of a propylene-based elastomer (manufactured by Exxon Mobil Corporation, product name: Vistamaxx 8380), 400 parts of a tackifier (manufactured by Eastman Chemical Company, product name: Eastotac H-100W), and 10 parts of an antioxidant (manufactured by BASF, product name: Irganox 1010) were compounded to provide a hot-melt pressure-sensitive adhesive (Olefin 2).

Production Example 3

As shown in Table 1, 600 parts of a propylene-based elastomer (manufactured by Exxon Mobil Corporation, product name: Vistamaxx 8780), 400 parts of a tackifier (manufactured by Exxon Mobil Corporation, product name: Escorez 5400), and 10 parts of an antioxidant (manufactured by BASF, product name: Irganox 1010) were compounded to provide a hot-melt pressure-sensitive adhesive (Olefin 3).

Production Example 4

As shown in Table 1, 500 parts of a propylene-based elastomer (manufactured by Exxon Mobil Corporation, product name: Vistamaxx 8380), 500 parts of a tackifier (manufactured by Exxon Mobil Corporation, product name: Escorez 5400), and 10 parts of an antioxidant (manufactured by BASF, product name: Irganox 1010) were compounded to provide a hot-melt pressure-sensitive adhesive (Olefin 4).

Production Example 5

As shown in Table 1, 540 parts of a propylene-based elastomer (manufactured by Exxon Mobil Corporation, product name: Vistamaxx 8380), 360 parts of a tackifier (manufactured by Exxon Mobil Corporation, product name: Escorez 5400), 100 parts of liquid paraffin (manufactured by Petro yag, product name: White Oil Pharma Oyster 259), and 10 parts of an antioxidant (manufactured by BASF, product name: Irganox 1010) were compounded to provide a hot-melt pressure-sensitive adhesive (Olefin 5).

Production Example 6

As shown in Table 1, 213 parts of a SIS-based resin (manufactured by Kraton Polymer, product name: Kraton D1165 PT), 619 parts of a tackifier (manufactured by Kolon Industries, Inc., product name: SUKOREZ SU-100 S), 84 parts of liquid paraffin (manufactured by Petro yag, product name: White Oil Pharma Oyster 259), and 10 parts of an antioxidant (manufactured by BASF, product name: Irganox 1010) were compounded to provide a hot-melt pressure-sensitive adhesive (Styrene 1).

hot-melt pressure-sensitive adhesive was applied (15 g/m$^2$) in a stripe manner (width of the pressure-sensitive adhesive: 1 mm, interval: 1 mm) over a width of 41 mm was obtained.

The results are shown in Table 2.

Example 2

A stretchable film (2) and a stretchable laminate (2) were obtained in the same manner as in Example 1 except that the formulation of each of the A layers was changed to a total of 100 parts formed of 78 parts of an olefin-based resin (manufactured by Exxon Mobil Corporation, product name: Vistamaxx 6202), 1.5 parts of behenic acid amide, 0.5 part of calcium stearate, and 20 parts of calcium carbonate.

The results are shown in Table 2.

TABLE 1

| | Olefin 1 | | Olefin 2 | | Olefin 3 | | Olefin 4 | | Olefin 5 | | Styrene 1 | |
|---|---|---|---|---|---|---|---|---|---|---|---|---|
| Raw materials | Composition (kg) | Raw materials | Composition (kg) | Raw materials | Composition (kg) | Raw materials | Composition (kg) | Raw materials | Composition (kg) | Raw materials | Composition (kg) |
| Vistamaxx 8380 | 600 | Vistamaxx 8380 | 600 | Vistamaxx 8780 | 600 | Vistamaxx 8380 | 500 | Vistamaxx 8380 | 540 | Kraton D1165 PT | 213 |
| Escorez 5400 | 400 | Eastotac H-100W | 400 | Escorez 5400 | 400 | Escorez 5400 | 500 | Escorez 5400 | 360 | Sukorez SU-100 | 619 |
| White Oil Pharma | 0 | White Oil Pharma | 0 | White Oil Pharma | 0 | White Oil Pharma | 0 | White Oil Pharma | 100 | White Oil Pharma | 84 |
| Irganox 1010 | 10 | Irganox 1010 | 10 | Irganox 1010 | 10 | Irganox 1010 | 10 | Irganox 1010 | 10 | Irganox 1010 | 10 |
| Total | 1,010 | Total | 1,010 | Total | 1,010 | Total | 1,010 | Total | 1,010 | Total | 926 |

Example 1

The following components were loaded into the A layers and B layer of an extrusion T-die molding machine including three layers in two types (A layer/B layer/A layer), and a stretchable film (1) having a total thickness of 60 μm in which the thicknesses of the A layer, the B layer, and the A layer were 2.5 μm, 55 μm, and 2.5 μm, respectively was extruded.

A layer: A total of 100 parts formed of 77.5 parts of an olefin-based resin (manufactured by Exxon Mobil Corporation, product name: Vistamaxx 6202), 2 parts of behenic acid amide (molecular weight=339.6), 0.5 part of calcium stearate, and 20 parts of calcium carbonate B layer: A total of 100 parts formed of 65 parts of an olefin-based resin (manufactured by Exxon Mobil Corporation, product name: Vistamaxx 6202), 30 parts of an olefin-based resin (manufactured by Mitsui Chemicals, Inc., product name: Tafmer PN-3560), and 5 parts of a white pigment (titanium oxide, manufactured by DuPont, product name: Ti-Pure R103)

Molding was performed by using the resultant stretchable film (1) and the hot-melt pressure-sensitive adhesive (Olefin 1) in accordance with <Molding Conditions> described above, and the portion (A) in which the hot-melt pressure-sensitive adhesive was entirely applied (7 g/m$^2$) over a width of 30 mm was cut at its center. Thus, a stretchable laminate (1) having, on each of both surfaces of the stretchable film (1), two portions (A1) and (A2) in which the hot-melt pressure-sensitive adhesive was entirely applied (7 g/m$^2$) over widths of 15 mm each from both ends, and the portion (B) between the portions (A1) and (A2) in which the Example 3

A stretchable film (3) and a stretchable laminate (3) were obtained in the same manner as in Example 1 except that the formulation of each of the A layers was changed to a total of 100 parts formed of 78.5 parts of an olefin-based resin (manufactured by Exxon Mobil Corporation, product name: Vistamaxx 6202), 1 part of behenic acid amide, 0.5 part of calcium stearate, and 20 parts of calcium carbonate.

The results are shown in Table 2.

Example 4

A stretchable film (4) and a stretchable laminate (4) were obtained in the same manner as in Example 1 except that the thickness of the stretchable film was changed to a total of 45 μm in which the thicknesses of the A layer, the B layer, and the A layer were 2.5 μm, 40 μm, and 2.5 μm, respectively.

The results are shown in Table 2.

Example 5

A stretchable film (5) and a stretchable laminate (5) were obtained in the same manner as in Example 1 except that the formulation of each of the A layers was changed to a total of 100 parts formed of 76 parts of an olefin-based resin (manufactured by Exxon Mobil Corporation, product name: Vistamaxx 6202), 3 parts of behenic acid amide, 1 part of calcium stearate, and 20 parts of calcium carbonate.

The results are shown in Table 2.

Example 6

A stretchable film (6) and a stretchable laminate (6) were obtained in the same manner as in Example 1 except that the formulation of each of the A layers was changed to a total of 100 parts formed of 55 parts of an olefin-based resin (manufactured by Exxon Mobil Corporation, product name: Vistamaxx 6102), 22.5 parts of an olefin-based resin (manufactured by Exxon Mobil Corporation, product name: Vistamaxx 3000), 2 parts of behenic acid amide, 0.5 part of calcium stearate, and 20 parts of calcium carbonate.

The results are shown in Table 2.

Example 7

A stretchable film (7) and a stretchable laminate (7) were obtained in the same manner as in Example 1 except that the formulation of the B layer was changed to a total of 100 parts formed of 95 parts of an olefin-based resin (manufactured by Exxon Mobil Corporation, product name: Vistamaxx 6202) and 5 parts of a white pigment (titanium oxide, manufactured by DuPont, product name: Ti-Pure R103).

The results are shown in Table 2.

Example 8

A stretchable film (8) and a stretchable laminate (8) were obtained in the same manner as in Example 1 except that behenic acid amide in each of the A layers was changed to oleic acid amide (molecular weight=281.48).

The results are shown in Table 3.

Example 9

A stretchable film (9) and a stretchable laminate (9) were obtained in the same manner as in Example 1 except that behenic acid amide in each of the A layers was changed to ethylenebis oleic acid amide (molecular weight=588.99).

The results are shown in Table 3.

Example 10

A stretchable film (10) and a stretchable laminate (10) were obtained in the same manner as in Example 1 except that behenic acid amide in each of the A layers was changed to ethylenebis behenic acid amide (molecular weight=705.23).

The results are shown in Table 3.

Example 11

A stretchable film (11) and a stretchable laminate (11) were obtained in the same manner as in Example 1 except that calcium stearate in each of the A layers was changed to magnesium stearate.

The results are shown in Table 3.

Example 12

A stretchable film (12) and a stretchable laminate (12) were obtained in the same manner as in Example 1 except that the hot-melt pressure-sensitive adhesive (Olefin 1) was changed to the hot-melt pressure-sensitive adhesive (Olefin 2).

The results are shown in Table 3.

Example 13

A stretchable film (13) and a stretchable laminate (13) were obtained in the same manner as in Example 1 except that the hot-melt pressure-sensitive adhesive (Olefin 1) was changed to the hot-melt pressure-sensitive adhesive (Olefin 3).

The results are shown in Table 3.

Example 14

A stretchable film (14) and a stretchable laminate (14) were obtained in the same manner as in Example 1 except that the hot-melt pressure-sensitive adhesive (Olefin 1) was changed to the hot-melt pressure-sensitive adhesive (Olefin 4).

The results are shown in Table 3.

Example 15

A stretchable film (15) and a stretchable laminate (15) were obtained in the same manner as in Example 1 except that the hot-melt pressure-sensitive adhesive (Olefin 1) was changed to the hot-melt pressure-sensitive adhesive (Olefin 5).

The results are shown in Table 3.

Example 16

A stretchable film (16) and a stretchable laminate (16) were obtained in the same manner as in Example 1 except that the hot-melt pressure-sensitive adhesive (Olefin 1) was changed to the hot-melt pressure-sensitive adhesive (Styrene 1).

The results are shown in Table 3.

Example 17

A stretchable film (17) and a stretchable laminate (17) were obtained in the same manner as in Example 1 except that the formulation of each of the A layers was changed to a total of 100 parts formed of 77.5 parts of an olefin-based resin (manufactured by Exxon Mobil Corporation, product name: Vistamaxx 6202), 2.5 parts of behenic acid amide, and 20 parts of calcium carbonate.

The results are shown in Table 4.

Example 18

A stretchable film (18) and a stretchable laminate (18) were obtained in the same manner as in Example 1 except that the formulation of each of the A layers was changed to a total of 100 parts formed of 97.5 parts of an olefin-based resin (manufactured by Exxon Mobil Corporation, product name: Vistamaxx 6202), 2 parts of behenic acid amide, and 0.5 part of calcium stearate.

The results are shown in Table 4.

Example 19

A stretchable film (19) and a stretchable laminate (19) were obtained in the same manner as in Example 1 except that the formulation of each of the A layers was changed to a total of 100 parts formed of 74.5 parts of an olefin-based resin (manufactured by Exxon Mobil Corporation, product name: Vistamaxx 6202), 5 parts of behenic acid amide, 0.5 part of calcium stearate, and 20 parts of calcium carbonate.

The results are shown in Table 4.

Comparative Example 1

A stretchable film (C1) and a stretchable laminate (C1) were obtained in the same manner as in Example 1 except that the formulation of each of the A layers was changed to 100 parts of an olefin-based resin (manufactured by Exxon Mobil Corporation, product name: Vistamaxx 6202).

The results are shown in Table 4.

Comparative Example 2

A stretchable film (C2) and a stretchable laminate (C2) were obtained in the same manner as in Example 1 except that the formulation of each of the A layers was changed to a total of 100 parts formed of 77.5 parts of an olefin-based resin (manufactured by Exxon Mobil Corporation, product name: Vistamaxx 6202), 2.5 parts of calcium stearate, and 20 parts of calcium carbonate.

The results are shown in Table 4.

TABLE 2

| | | Example | | | | | | |
|---|---|---|---|---|---|---|---|---|
| | | 1 | 2 | 3 | 4 | 5 | 6 | 7 |
| A layer resin (1) | | Vistamaxx 6202 | Vistamaxx 6202 | Vistamaxx 6202 | Vistamaxx 6202 | Vistamaxx 6202 | Vistamaxx 6102 | Vistamaxx 6202 |
| A layer resin (2) | | — | — | — | — | — | Vistamaxx 3000 | — |
| A layer additive (3) | | Behenic acid amide | Behenic acid amide | Behenic acid amide | Behenic acid amide | Behenic acid amide | Behenic acid amide | Behenic acid amide |
| A layer additive (4) | | Calcium stearate | Calcium stearate | Calcium stearate | Calcium stearate | Calcium stearate | Calcium stearate | Calcium stearate |
| A layer additive (5) | | CaCO3 | CaCO3 | CaCO3 | CaCO3 | CaCO3 | CaCO3 | CaCO3 |
| B layer resin (1) | | Vistamaxx 6202 | Vistamaxx 6202 | Vistamaxx 6202 | Vistamaxx 6202 | Vistamaxx 6202 | Vistamaxx 6202 | Vistamaxx 6202 |
| B layer resin (2) | | Tafmer PN-3560 | Tafmer PN-3560 | Tafmer PN-3560 | Tafmer PN-3560 | Tafmer PN-3560 | Tafmer PN-3560 | — |
| B layer additive (3) | | TiO2 | TiO2 | TiO2 | TiO2 | TiO2 | TiO2 | TiO2 |
| A layer formulation (1)/(2)/(3)/(4)/(5) | | 77.5/0/2/0.5/20 | 78/0/1.5/0.5/20 | 78.5/0/1/0.5/20 | 77.5/0/2/0.5/20 | 76/0/3/1/20 | 55/22.5/2/0.5/20 | 77.5/0/2/0.5/20 |
| B layer formulation (1)/(2)/(3) | | 65/30/5 | 65/30/5 | 65/30/5 | 65/30/5 | 65/30/5 | 65/30/5 | 95/0/5 |
| A/B/A thickness | μm | 2.5/55/2.5 | 2.5/55/2.5 | 2.5/55/2.5 | 2.5/40/2.5 | 2.5/55/2.5 | 2.5/55/2.5 | 2.5/55/2.5 |
| Total thickness of elastic film | μm | 60 | 60 | 60 | 45 | 60 | 60 | 60 |
| Kind of hot-melt pressure-sensitive adhesive | | Olefin 1 | Olefin 1 | Olefin 1 | Olefin 1 | Olefin 1 | Olefin 1 | Olefin 1 |
| Kind of non-woven fabric | | Carded 24 g/m² | Carded 24 g/m² | Carded 24 g/m² | Carded 24 g/m² | Carded 24 g/m² | Carded 24 g/m² | Carded 24 g/m² |
| T-die extrudability | OK/NG | OK | OK | OK | OK | OK | OK | OK |
| Elastic film delivery test (50 m/min) | o/Δ/x | o | o | o | o | o | o | o |
| Elastic film delivery test (100 m/min) | o/Δ/x | o | o | o | o | o | o | o |
| Elastic film delivery test (250 m/min) | o/Δ/x | o | o | Δ | o | o | o | o |
| Test for holding force at 40° C. | OK/NG | OK | OK | OK | OK | OK | OK | OK |
| Presence or absence of delamination | | OK | OK | OK | OK | OK | OK | OK |
| Elasticity test | OK/NG | OK | OK | OK | OK | OK | OK | OK |

TABLE 3

| | Example | | | | |
|---|---|---|---|---|---|
| | 8 | 9 | 10 | 11 | 12 |
| A layer resin (1) | Vistamaxx 6202 | Vistamaxx 6202 | Vistamaxx 6202 | Vistamaxx 6202 | Vistamaxx 6202 |
| A layer resin (2) | — | — | — | — | — |
| A layer additive (3) | Oleic acid amide | Ethylenebis oleic acid amide | Ethylenebis behenic acid amide | Behenic acid amide | Behenic acid amide |
| A layer additive (4) | Calcium stearate | Calcium stearate | Calcium stearate | Magnesium stearate | Calcium stearate |
| A layer additive (5) | CaCO3 | CaCO3 | CaCO3 | CaCO3 | CaCO3 |
| B layer resin (1) | Vistamaxx 6202 | Vistamaxx 6202 | Vistamaxx 6202 | Vistamaxx 6202 | Vistamaxx 6202 |
| B layer resin (2) | Tafmer PN-3560 | Tafmer PN-3560 | Tafmer PN-3560 | Tafmer PN-3560 | Tafmer PN-3560 |

TABLE 3-continued

|  |  | | | | | |
|---|---|---|---|---|---|---|
| B layer additive (3) |  | TiO2 | TiO2 | TiO2 | TiO2 | TiO2 |
| A layer formulation (1)/(2)/(3)/(4)/(5) |  | 77.5/0/2/0.5/20 | 77.5/0/2/0.5/20 | 77.5/0/2/0.5/20 | 77.5/0/2/0.5/20 | 77.5/0/2/0.5/20 |
| B layer formulation (1)/(2)/(3) |  | 65/30/5 | 65/30/5 | 65/30/5 | 65/30/5 | 65/30/5 |
| A/B/A thickness | μm | 2.5/55/2.5 | 2.5/55/2.5 | 2.5/55/2.5 | 2.5/55/2.5 | 2.5/55/2.5 |
| Total thickness of elastic film | μm | 60 | 60 | 60 | 60 | 60 |
| Kind of hot-melt pressure-sensitive adhesive |  | Olefin 1 | Olefin 1 | Olefin 1 | Olefin 1 | Olefin 2 |
| Kind of non-woven fabric |  | Carded 24 g/m² | Carded 24 g/m² | Carded 24 g/m² | Carded 24 g/m² | Carded 24 g/m² |
| T-die extrudability | OK/NG | OK | OK | OK | OK | OK |
| Elastic film delivery test (50 m/min) | ○/Δ/x | ○ | ○ | ○ | ○ | ○ |
| Elastic film delivery test (100 m/min) | ○/Δ/x | ○ | ○ | ○ | ○ | ○ |
| Elastic film delivery test (250 m/min) | ○/Δ/x | ○ | ○ | Δ | ○ | ○ |
| Test for holding force at 40° C. | OK/NG | OK | OK | OK | OK | OK |
| Presence or absence of delamination |  |  |  |  |  |  |
| Elasticity test | OK/NG | OK | OK | OK | OK | OK |

|  |  | Example | | | |
|---|---|---|---|---|---|
|  |  | 13 | 14 | 15 | 16 |
| A layer resin (1) |  | Vistamaxx 6202 | Vistamaxx 6202 | Vistamaxx 6202 | Vistamaxx 6202 |
| A layer resin (2) |  | — | — | — | — |
| A layer additive (3) |  | Behenic acid amide | Behenic acid amide | Behenic acid amide | Behenic acid amide |
| A layer additive (4) |  | Calcium stearate | Calcium stearate | Calcium stearate | Calcium stearate |
| A layer additive (5) |  | CaCO3 | CaCO3 | CaCO3 | CaCO3 |
| B layer resin (1) |  | Vistamaxx 6202 | Vistamaxx 6202 | Vistamaxx 6202 | Vistamaxx 6202 |
| B layer resin (2) |  | Tafmer PN-3560 | Tafmer PN-3560 | Tafmer PN-3560 | Tafmer PN-3560 |
| B layer additive (3) |  | TiO2 | TiO2 | TiO2 | TiO2 |
| A layer formulation (1)/(2)/(3)/(4)/(5) |  | 77.5/0/2/0.5/20 | 77.5/0/2/0.5/20 | 77.5/0/2/0.5/20 | 77.5/0/2/0.5/20 |
| B layer formulation (1)/(2)/(3) |  | 65/30/5 | 65/30/5 | 65/30/5 | 65/30/5 |
| A/B/A thickness | μm | 2.5/55/2.5 | 2.5/55/2.5 | 2.5/55/2.5 | 2.5/55/2.5 |
| Total thickness of elastic film | μm | 60 | 60 | 60 | 60 |
| Kind of hot-melt pressure-sensitive adhesive |  | Olefin 3 | Olefin 4 | Olefin 5 | Styrene 1 |
| Kind of non-woven fabric |  | Carded 24 g/m² | Carded 24 g/m² | Carded 24 g/m² | Carded 24 g/m² |
| T-die extrudability | OK/NG | OK | OK | OK | OK |
| Elastic film delivery test (50 m/min) | ○/Δ/x | ○ | ○ | ○ | ○ |
| Elastic film delivery test (100 m/min) | ○/Δ/x | ○ | ○ | ○ | ○ |
| Elastic film delivery test (250 m/min) | ○/Δ/x | ○ | ○ | ○ | ○ |
| Test for holding force at 40° C. | OK/NG | OK | OK | OK | OK |
| Presence or absence of delamination |  |  |  |  |  |
| Elasticity test | OK/NG | OK | OK | OK | OK |

TABLE 4

|  | Example | | | Comparative Example | |
|---|---|---|---|---|---|
|  | 17 | 18 | 19 | 1 | 2 |
| A layer resin (1) | Vistamaxx 6202 | Vistamaxx 6202 | Vistamaxx 6202 | Vistamaxx 6202 | Vistamaxx 6202 |
| A layer resin (2) | — | — | — | — | — |
| A layer additive (3) | Behenic acid amide | Behenic acid amide | Behenic acid amide | — | — |
| A layer additive (4) | — | Calcium stearate | Calcium stearate | — | Calcium stearate |
| A layer additive (5) | CaCO3 | — | CaCO3 | — | CaCO3 |
| B layer resin (1) | Vistamaxx 6202 | Vistamaxx 6202 | Vistamaxx 6202 | Vistamaxx 6202 | Vistamaxx 6202 |

TABLE 4-continued

|  |  | Example | | | Comparative Example | |
| --- | --- | --- | --- | --- | --- | --- |
|  |  | 17 | 18 | 19 | 1 | 2 |
| B layer resin (2) |  | Tafmer PN-3560 | Tafmer PN-3560 | Tafmer PN-3560 | Tafmer PN-3560 | Tafmer PN-3560 |
| B layer additive (3) |  | TiO2 | TiO2 | TiO2 | TiO2 | TiO2 |
| A layer formulation (1)/(2)/(3)/(4)/(5) |  | 77.5/0/2.5/0/20 | 97.5/0/2/0.5/0 | 74.5/0/5/0.5/20 | 100/0/0/0/0 | 77.5/0/0/2.5/20 |
| B layer formulation |  | 65/30/5 | 65/30/5 | 65/30/5 | 65/30/5 | 65/30/5 |
| A/B/A thickness | μm | 2.5/55/2.5 | 2.5/55/2.5 | 2.5/55/2.5 | 2.5/55/2.5 | 2.5/55/2.5 |
| Total thickness of elastic film | μm | 60 | 60 | 60 | 60 | 60 |
| Kind of hot-melt pressure-sensitive adhesive |  | Olefin 1 | Olefin 1 | Olefin 1 | Olefin 1 | Olefin 1 |
| Kind of non-woven fabric |  | Carded 24 g/m² | Carded 24 g/m² | Carded 24 g/m² | Carded 24 g/m² | Carded 24 g/m² |
| T-die extrudability | OK/NG | NG | OK | OK | NG | OK |
| Elastic film delivery test (50 m/min) | o/Δ/x | o | Δ | o | x | o |
| Elastic film delivery test (100 m/min) | o/Δ/x | o | Δ | o | x | Δ |
| Elastic film delivery test (250 m/min) | o/Δ/x | o | Δ | o | x | x |
| Test for holding force at 40° C. | OK/NG | OK | OK | NG | OK | OK |
| Presence or absence of delamination |  |  |  |  |  |  |
| Elasticity test | OK/NG | OK | OK | OK | OK | OK |

INDUSTRIAL APPLICABILITY

The stretchable laminate including the stretchable film of the present invention can be used in any appropriate article in which the effects of the present invention can be effectively utilized. That is, the article of the present invention includes the stretchable laminate of the present invention. A typical example of such article is a sanitary article. Examples of such sanitary article include a diaper (in particular, an ear portion of a disposable diaper), a supporter, and a mask.

REFERENCE SIGNS LIST 100 stretchable film
10 elastomer layer (A1)
20 elastomer layer (B)
30 elastomer layer (A2)
200 stretchable laminate
40 non-woven fabric layer
50 non-woven fabric layer
60 hot-melt pressure-sensitive adhesive

The invention claimed is:

1. A stretchable film, comprising a laminated film of a plurality of elastomer layers,
    wherein the stretchable film comprises an elastomer layer (A1), an elastomer layer (B), and an elastomer layer (A2) in the stated order,
    wherein the elastomer layer (A1) and the elastomer layer (A2) are arranged as outer layers, and
    wherein each of the elastomer layer (A1) and the elastomer layer (A2) contains a fatty acid amide and a metal soap,
    wherein a content of the fatty acid amide in the elastomer layer (A1) and a content of the fatty acid amide in the elastomer layer (A2) are each from 0.75 wt % to 4 wt %.

2. The stretchable film according to claim 1, wherein the stretchable film is formed of the elastomer layer (A1), the elastomer layer (B), and the elastomer layer (A2).

3. The stretchable film according to claim 2, wherein the elastomer layer (A1) has a thickness of from 1 μm to 15 μm, the elastomer layer (B) has a thickness of from 18 μm to 148 μm, and the elastomer layer (A2) has a thickness of from 1 μm to 15 μm.

4. The stretchable film according to claim 1, wherein the elastomer layer (A1) has a thickness of from 1 μm to 15 μm, the elastomer layer (B) has a thickness of from 18 μm to 148 μm, and the elastomer layer (A2) has a thickness of from 1 μm to 15 μm.

5. The stretchable film according to claim 1, wherein the fatty acid amide comprises a fatty acid amide having a molecular weight of 750 or less.

6. The stretchable film according to claim 1, wherein the metal soap comprises at least one kind selected from a fatty acid calcium, a fatty acid magnesium, and a fatty acid zinc.

7. The stretchable film according to claim 1, wherein the metal soap comprises at least one kind selected from calcium stearate, magnesium stearate, and zinc stearate.

8. The stretchable film according to claim 1, wherein a content of the metal soap in the elastomer layer (A1) and a content of the metal soap in the elastomer layer (A2) are each from 0.01 wt % to 5 wt %.

9. The stretchable film according to claim 8, wherein the contents of the metal soap are each from 0.25 wt % to 2.5 wt %.

10. The stretchable film according to claim 1, wherein each of the elastomer layer (A1) and the elastomer layer (A2) contains calcium carbonate.

11. The stretchable film according to claim 10, wherein a content of the calcium carbonate in the elastomer layer (A1) and a content of the calcium carbonate in the elastomer layer (A2) are each from 1 wt % to 50 wt %.

12. The stretchable film according to claim 11, wherein the contents of the calcium carbonate are each from 5 wt % to 30 wt %.

13. The stretchable film according to claim 2, wherein each of the elastomer layer (A1) and the elastomer layer (A2) contains calcium carbonate.

14. The stretchable film according to claim 13, wherein a content of the calcium carbonate in the elastomer layer (A1) and a content of the calcium carbonate in the elastomer layer (A2) are each from 1 wt % to 50 wt %.

15. The stretchable film according to claim 14, wherein the contents of the calcium carbonate are each from 5 wt % to 30 wt %.

16. The stretchable film according to claim 1, wherein each of the elastomer layer (A1) and the elastomer layer (A2) contains an olefin-based elastomer.

17. The stretchable film according to claim 16, wherein the olefin-based elastomer comprises an α-olefin-based elastomer.

18. The stretchable film according to claim 17, wherein the α-olefin-based elastomer comprises at least one kind selected from an ethylene-based elastomer, a propylene-based elastomer, and a 1-butene-based elastomer.

19. The stretchable film according to claim 1, wherein the elastomer layer (B) contains an olefin-based elastomer.

20. The stretchable film according to claim 19, wherein the olefin-based elastomer comprises an α-olefin-based elastomer.

21. The stretchable film according to claim 20, wherein the α-olefin-based elastomer comprises at least one kind selected from an ethylene-based elastomer, a propylene-based elastomer, and a 1-butene-based elastomer.

22. A stretchable laminate, comprising:
the stretchable film of claim 1; and
a non-woven fabric layer arranged on at least one side of the stretchable film.

23. An article, comprising the stretchable laminate of claim 22.

24. The stretchable film according to claim 1, wherein the content of the fatty acid amide in the elastomer layer (A1) and the content of the fatty acid amide in the elastomer layer (A2) are each from 0.75 wt % to 2.5 wt %.

25. The stretchable film according to claim 1, wherein the content of the fatty acid amide in the elastomer layer (A1) and the content of the fatty acid amide in the elastomer layer (A2) are each from 1 wt % to 2.5 wt %.

26. The stretchable film according to claim 1, wherein the content of the fatty acid amide in the elastomer layer (A1) and the content of the fatty acid amide in the elastomer layer (A2) are each from 1 wt % to 2 wt %.

* * * * *